No. 817,754. PATENTED APR. 17, 1906.
H. DIECKS.
CAN SOLDERING MACHINE.
APPLICATION FILED OCT. 25, 1904.

3 SHEETS—SHEET 1.

Witnesses
E. F. Stewart
Jno. E. Parker

Henry Diecks, Inventor.
by C. A. Snow & Co.
Attorneys

No. 817,754. PATENTED APR. 17, 1906.
H. DIECKS.
CAN SOLDERING MACHINE.
APPLICATION FILED OCT. 25, 1904.

3 SHEETS—SHEET 2.

Witnesses
Henry Diecks, Inventor.
by
Attorneys

No. 817,754.   
PATENTED APR. 17, 1906.  
H. DIECKS.  
CAN SOLDERING MACHINE.  
APPLICATION FILED OCT. 25, 1904.
3 SHEETS—SHEET 3.
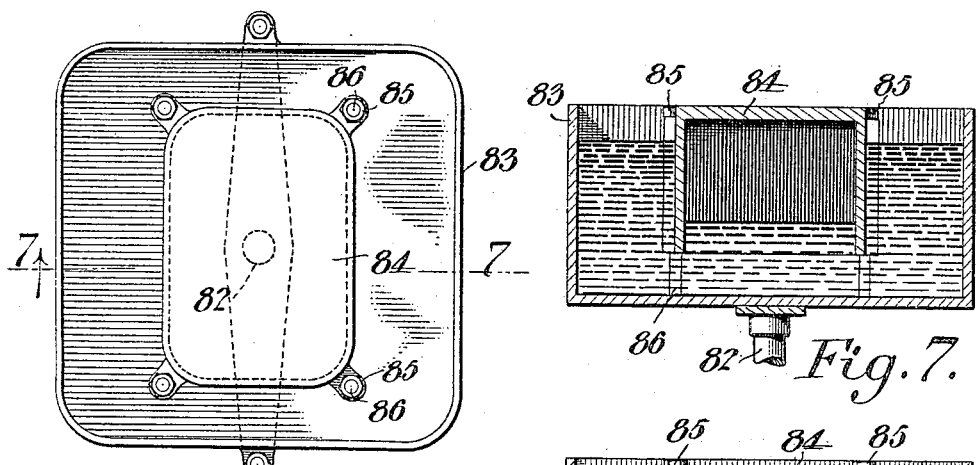
Henry Diecks, Inventor.

UNITED STATES PATENT OFFICE.

HENRY DIECKS, OF EASTPORT, MAINE.

CAN-SOLDERING MACHINE.

No. 817,754.  Specification of Letters Patent.  Patented April 17, 1906.

Application filed October 25, 1904. Serial No. 229,938.

*To all whom it may concern:*

Be it known that I, HENRY DIECKS, a citizen of the United States, residing at Eastport, in the county of Washington and State of Maine, have invented a new and useful Can-Soldering Machine, of which the following is a specification.

This invention relates to machines for soldering cans and other articles, and has for its principal object to provide a means for soldering can tops or bottoms to the bodies in a very rapid and economical manner.

A further object of the invention is to materially reduce the cost of tin cans and the like by soldering the tops or bottoms to the can-bodies without the necessity of any preliminary interlocking, fitting, or crimping apparatus, such as are ordinarily used in the manufacture of cans.

A still further object of the invention is to provide a machine whereby the can bodies and tops or bottoms, or both, may be clamped to each other and dipped into molten solder, the clamping action being continued until the solder is cooled to an extent sufficient to hold the parts together.

A still further object of the invention is to provide a can-dipping machine in which provision is made for protecting all of the surface except that at the edges to be soldered from the action of the acid or other flux and from contact with the solder.

With these and other objects in view, as will more fully hereinafter appear, the invention consists in the novel construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
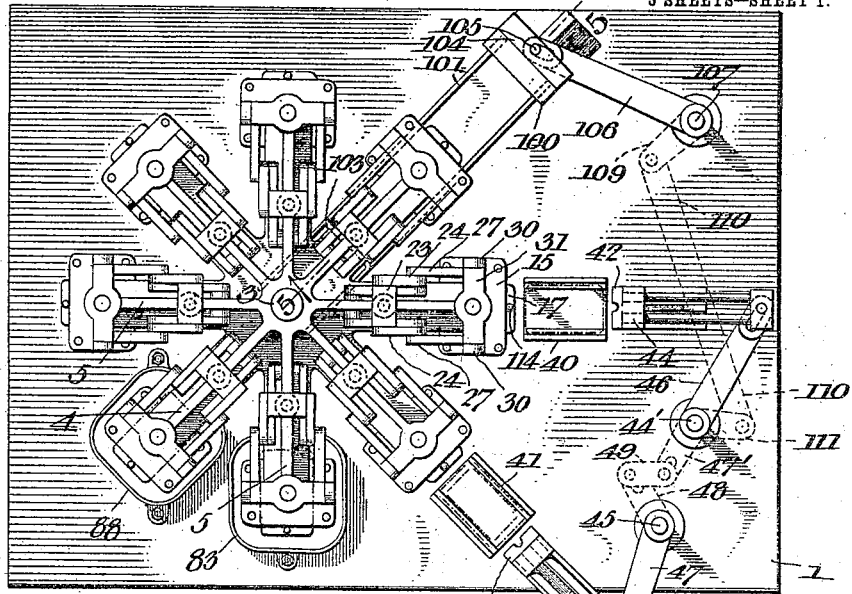
Figure 2:
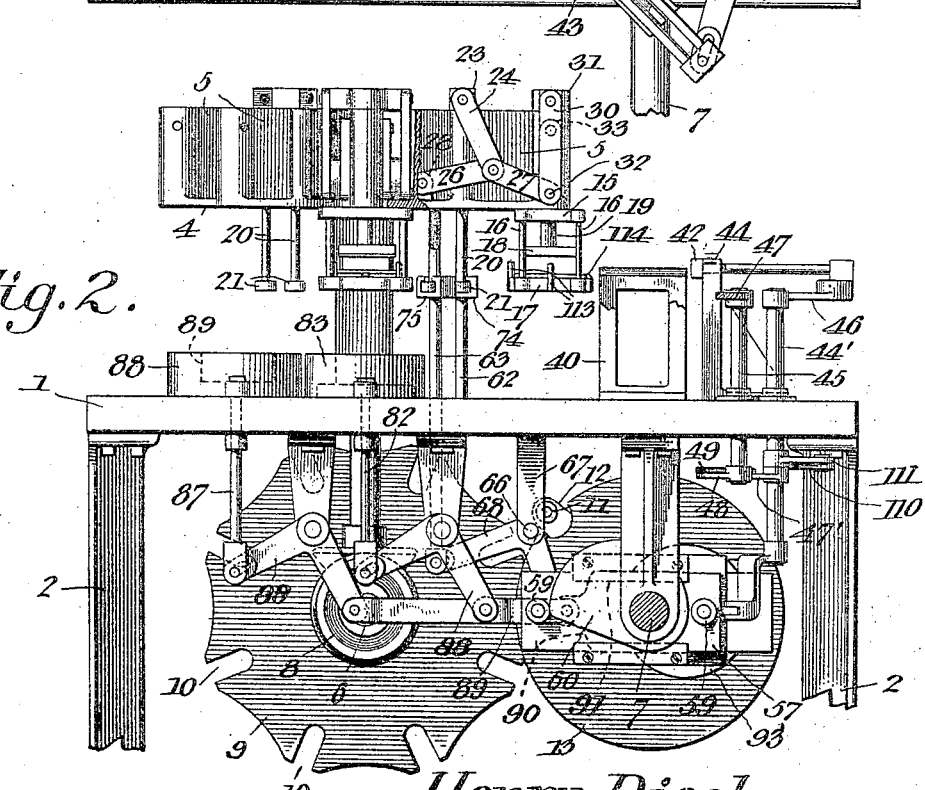
Figures 3, 4:
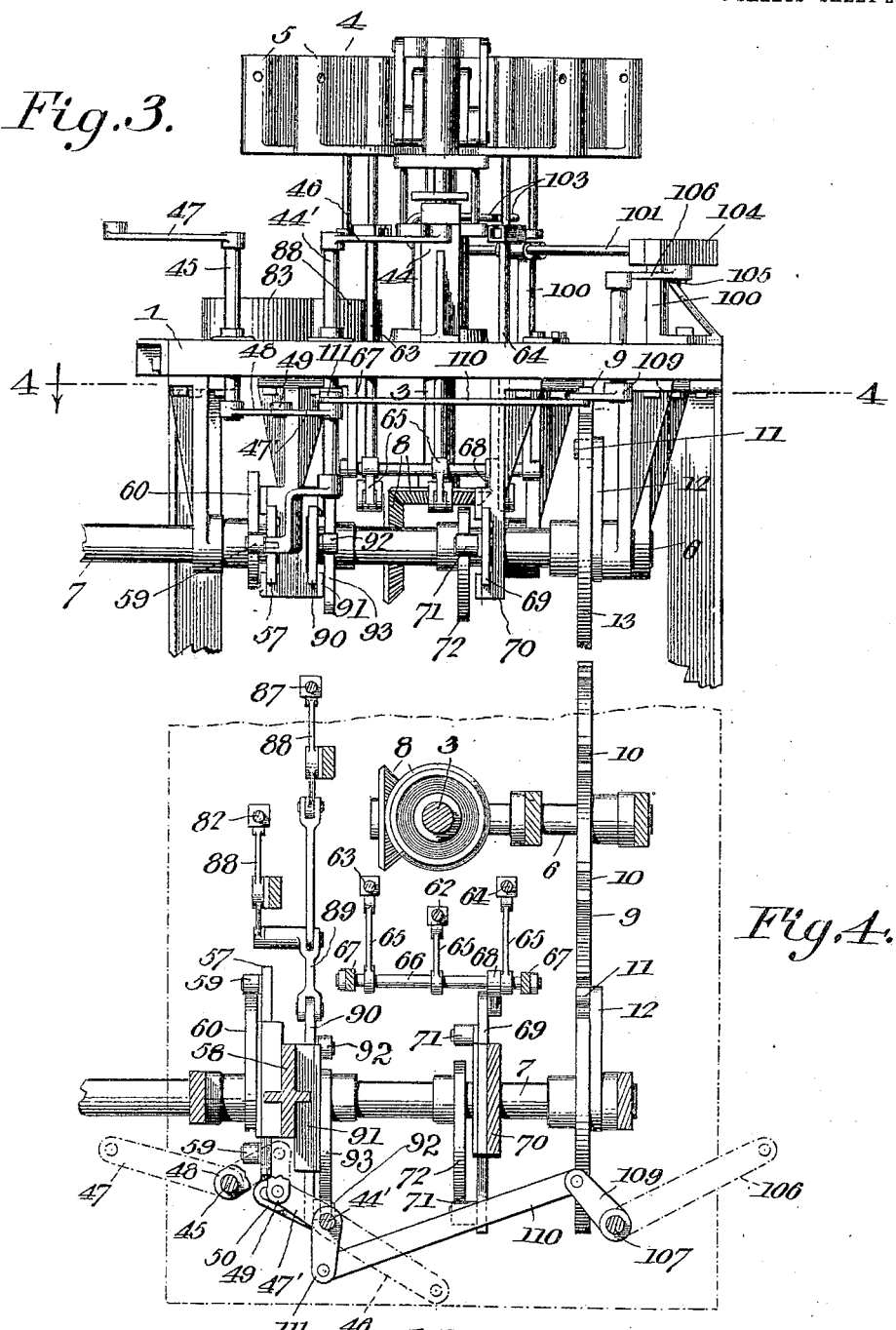

In the accompanying drawings, Figure 1 is a plan view of the can-soldering machine constructed in accordance with the invention. Fig. 2 is an end elevation of the same. Fig. 3 is a front elevation of the machine. Fig. 4 is a sectional plan view of the same on the line 4 4 of Fig. 3. Fig. 5 is a sectional view on the line 5 5 of Fig. 1. Fig. 6 is a plan view of one of the dipping-troughs detached. Fig. 7 is a transverse sectional elevation of the same on the line 7 7 of Fig. 6. Fig. 8 is a similar view showing the cup depressed. Fig. 9 is a detail perspective view of the knock-off finger or slide detached. Fig. 10 is a similar view of one of the grooved guides for transmitting movement to the can-clamps. Fig. 11 is a similar view of one of the lower can-clamps.

Similar numerals of reference are employed to indicate corresponding parts throughout the several figures of the drawings.

The several working parts of the apparatus are mounted on a suitable frame which includes a table 1, carried by a plurality of standards 2. This frame has bearings for the reception of a vertically-disposed shaft 3, to which is secured a revoluble carrier 4, having a plurality of radially-disposed arms 5, eight of which are employed in the present instance, although the number of arms may be increased or diminished to any desired extent. These arms carry can-clamping members, to which are fed the can bodies and tops or bottoms, and the carrier receives a step-by-step rotative movement to present the cans first to a trough containing acid or other flux and then to a trough containing molten solder.

At a point under the table are bearings for the reception of two shafts 6 and 7, and said shaft 6 is connected by gears 8 to the vertical shaft 3. On the end of the shaft 6 is arranged a disk 9, having a plurality of radially-disposed notches 10, with which may engage a pin 11, carried by an arm 12, that is mounted on a shaft 7, and at each complete rotative movement of the shaft 7 the pin 11 will enter one of the notches 10 and will revolve the disk 9 one-eighth of a revolution, and this movement will be imparted through the gear 7 to the revoluble carrier, it being understood that the number of notches 10 is equal to the number of radial arms of the carrier. The shaft 7 further supports a disk 13, the periphery of which engages the periphery of the disk 9 at points between the notches 10, the construction of the parts as a whole resembling the well-known Geneva stop.

To the outer end of each of the arms 5 is secured a horizontally-disposed plate 15 of a contour corresponding approximately to that of the cans to be soldered, this in the present instance being in the form of the well-known shallow rectangular cans used for the packing of sardines and the like, although the construction of this and all parts of the machine may of course be altered in order that cans of any size and shape may be made. At a point below the plate 15 and secured thereto by a number of vertically-disposed bolts 16 is a lower clamp-plate 17, forming a support on which the can is placed to be soldered. The coacting clamp member is in the form of a small clamping-plate 18, that is arranged within the lines of the several bolts 16, and to the center of this clamping-plate 18 is secured a vertically-disposed rod 19, guided in a suitable opening at the outer end of the arm 5. Each of the arms is further provided with a guiding-opening for the reception of a vertically-movable rod 20, having at its lower end a small disk or block 21. To the upper end of the rod 20 is secured a horizontally-disposed block 23, to which are pivoted two links 24, and these links are connected to the pivotally-connected ends of a pair of toggle-levers 26 and 27, the inner ends of the levers 26 being pivoted to fixed brackets or lugs 28 on the arm 5, and the outer ends of the links 27 being pivotally connected to links 30. There are two links 30 arranged, respectively, at opposite sides of the vertical rod 19, and said links are connected at their upper ends to a cross-bar 31, that is rigidly secured to the upper end of the rod 19. The pins 32, which connect the levers 27 to the links 30, also form a pivot-point for a pair of links 33, the upper ends of which are pivoted to the opposite sides of the arm 5.

The construction is such that if upward movement be imparted to the rod 20 it will act through the toggle-levers in such manner as to draw the links 30 and 33 toward the center of rotation of the carrier, and owing to the difference in the pivotal connections of the upper ends of the links 30 and 33 the links 30 will be moved upward, carrying with them the cross-bar 31 and the rod 19, the latter elevating the upper clamp-plate 18 in order to permit the placing of the can and top or bottom on the lower clamping-plate 17. These clamping-plates are preferably formed of some metal to which solder will not readily cling, so that when dipped in the molten solder the clamping-plates will remain clean, the solder being retained only by that portion of the can which has previously been subjected to acid or other flux. Each of the arms carries one of the stems or rods 20, and each of these is provided, as previously described, with a disk or block 21 at its lower end.

At the front of the machine are two feed-tables 40 and 41, that are separated from each other for a distance corresponding to the angular distance between each two arms of the carrier, and in the present instance it will be forty-five degrees. The table 40 is arranged for the reception of can tops or bottoms. In order to feed single tops or bottoms and single can-bodies to the lower clamp-plate 17, a pair of suitably-guided plungers 42 and 43 is used. These plungers are guided by brackets 44 and are connected, respectively, to rock-shafts 44' and 45 by arms 46 and 47, the outer ends of the arms being slotted for the reception of pins carried by the stems of the plungers in order to permit the necessary movement of the arms. The shafts 44' and 45 are held in suitable bearings in the frame and extend down to a point under the table. To the lower ends of these shafts are secured rocker-arms 47' and 48, having pin-and-slot connection with a link 49, so that movement imparted to one of the shafts will be transmitted to the other. The shaft 44' has a rocker-arm 50, having a pin-and-slot connection with a horizontally-mounted slide 57, that is held by depending brackets 58 under the table. This slide has a pair of spaced pins 59, which are engaged by a cam 60, mounted on a shaft 7, and at each rotative movement of the shaft the cam will reciprocate the slide, and the movement will be transmitted through the previously-described mechanism to the plungers 42 and 43, the plunger 42 first moving a can top or bottom from the table to the lower clamp-plate, and after the machine has moved around to the extent of one-eighth of a revolution the plunger 43 will force a can-body on top of the previously-fed can top or bottom.

At the feeding side of the machine are arranged guides for vertically-movable rods 62, 63, and 64, all of which are connected at their lower ends to rocker-arms 65, extending from a rock-shaft 66, that is supported in hangers 67, depending from the table. To the shaft is also secured a rocker-arm 68, that is connected to a slide 69, adapted to suitable guideways in a box-lid 70, carried by the frame. On this slide are small rollers 71, adapted to be engaged by a revoluble cam 72, mounted on the shaft 7, and once during each revolution of the shaft the three rods 62, 63, and 64 will be elevated and depressed.

The three rods are separated from each other arcuate distances of forty-five degrees, and all are disposed at the same distance from the center of rotation of the vertical shaft 3. The three rods carry, respectively, grooved guides 74, 75, and 76, and these are adapted to receive the disks or blocks 21, carried by the lower ends of the rods 20, each disk entering the guides and each receiving movement therefrom.

When one of the disks or blocks enters the guide 74, the latter is moved upward, and this movement is transmitted by the various link connections to the upper clamp-plate 18, raising the latter until the can-bottom has been fed from the table 40 onto the lower clamp-plate. On descent of the rod and guide the clamp-plate will also be pulled down, and the parts will remain in this position until the disk enters the guide 75, whereupon the same operation takes place to permit the feeding of a can-body from the table 41. The descent of the upper clamp-plate will then firmly clamp the can body and bottom, and the parts will be held during the subsequent operation until the disk or block enters the final guide 76, where the clamp will be again elevated to permit the knock-off or discharge of the soldered can.

The table is provided with bearings for the reception of a vertically-movable rod 82, which extends through the table and is provided at its upper end with a small open-top tank 83, containing acid or similar flux. In this tank is placed an inverted cup 84, the lower edge of which is immersed in the acid, so as to form an air-cushion between the upper surface of the acid and the top of the cup 84, and this air-cushion maintains the cup in elevated position, the upward limit of movement of such cup being governed by nuts 85, arranged on the upper threaded ends of a series of vertically-disposed guiding-rods 86. The table is further provided with bearings or guides for the reception of a vertically-movable rod 87, carrying at its upper end a solder-tank 88, in which is mounted an inverted cup 89, the construction here being similar to that employed in the acid-tank; but in the soldering-tank the air-cushion performs an additional function of preventing the upper surface of the cup being heated by direct contact with the molten solder. The rods 82 and 87 are each connected by a bell-crank lever 88 to a link 89, that is connected to one end of a slide 90, mounted in suitable guiding-brackets 91, carried by the table. The slide 90 is provided with a pair of pins or antifriction-rollers 92, with which engages a cam 93, that is secured to the shaft 7, which receives one complete rotative movement for each eighth revolution of the carrier 4, and the cam 93 will therefore elevate both of the tanks once during each eighth revolution of the carrier.

In alinement with the guide 76 is arranged a discharging or knock-off apparatus of the character best shown in Figs. 5 and 9. This comprises a pair of brackets 100, forming guides for the passage of a pair of bars 101, that extend below the plane of the lower clamp and inward to a point slightly beyond the axial line of the vertical shaft 3, the arms being spaced from each other at a distance sufficient to permit one to pass on each side of the support, and thence being bent upwardly and outwardly to a position above the plane of the upper surface of the lower clamp-plate. The intermeshing ends of the bars are bent inward toward each other, forming fingers 103, that are adapted to engage with the cans and move the same from the lower clamp-plate, the discharged cans being thence conveyed away either by hand or by suitable automatic mechanism.

The two arms are connected by a bar 104, having a pin 105 extending into a slot formed in one end of a rocker-arm 106. This rocker-arm is secured to the outer end of a bracket 107, adapted to suitable bearings in the table, and at its lower end carries a rocker-arm 109, that is connected by a link 110 to a rocker-arm 111 on the shaft 44', the arrangement of the parts being such that each time a can-bottom is fed to one clamp and a can-body to another clamp the knock-off arms will move a finished can from between a third set of clamp-plates.

In order to properly guide the can bottoms and bodies, each of the lower clamp-plates is provided with a plurality of guideways 113 114, the latter extending but a short distance above the upper surface of the clamp-plate in order to permit the ready entrance and discharge of the articles.

In the operation of the machine all of the cams receive one complete revolution with the shaft 7, while the main carrier-shaft is revolved one-eighth of a revolution. The operation of the cam 72 serves first to raise and then to lower the three rods 62, 63, and 64, and if three of the disks or blocks be entered in the respective guides 74, 75, and 76 these three disks or blocks will be simultaneously raised and lowered and the clamp-plates connected thereto will be opened, one for the admission of a can-bottom, another for the admission of a can-body, and a third for the discharge of the soldered can.

After the reception of a can-bottom from the feed-table 40 the carrier is turned to the extent of one-eighth of a revolution and at the next operation receives a can-body that is guided on top of the can-bottom, after which the upper clamp-plate is drawn down and firmly clamps the body and bottom together. At the next eighth revolution the clamped body and bottom are presented above the acid tank or trough and the latter is raised until the inverted cup comes into contact with the bottom of the clamp-plate. Further movement will result in the raising of the tank without corresponding movement of the cup and the latter being immersed to a more or less extent into the tank will raise the level of the acid therein until the acid overflows the lower clamp-plate and comes into contact with the meeting edges of the can body and bottom. The acid-tank is then lowered and at the next eighth revolution the parts halt above the solder-tank. The solder-tank is then raised and the process at the acid-tank is repeated, with the exception that solder now comes into contact with the clamping edges of the can body and bottom and forms a fluid-proof joint. Throughout the remaining intermittent movement of the carrier the solder is gradually cooled and when it arrives at the discharging-point is sufficiently set to permit the removal of the can, the latter being then in readiness for receiving the sardines or other articles to be packed therein.

It will be observed that with a machine of this character it will be possible to solder the cans in a very rapid and economical manner, it being wholly unnecessary to increase the expense by flanging and interlocking the meeting edges of the can and bottom before application of the solder, this differing materially from the ordinary process of can making where the joint is formed by overlapping, crimping, or otherwise uniting the two edges of the can and bottom in order to form a joint and subsequently sealing the joint by solder.

Having thus described the invention, what is claimed is—

1. In a can-soldering machine, a clamp, means for separately feeding parts of the can to the clamp, means for actuating said clamp to hold the parts in position, and means for applying solder to the meeting edges of the parts while the latter are held clamped together.

2. In a can-soldering machine, a clamping means, mechanism for separately feeding parts of a can thereinto, said clamping means serving to hold said parts properly assembled, and means for applying solder to the parts when so assembled.

3. In a can-soldering machine, a clamping means, independent mechanisms for successively feeding can parts to said clamping means, the latter serving to hold the parts assembled, and means for applying solder to the parts while in assembled position.

4. In a can-soldering machine, a clamping means, independent mechanisms for successively feeding can parts thereinto, means for centering the can parts in the clamp, means for applying a flux to the adjacent edges of the clamp parts, and means for applying solder to the flux-coated edges.

5. In a can-soldering machine, a movable carrier having a series of clamps, and a plurality of feeding mechanisms operating simultaneously, one to introduce a can-head into one clamp, and the other to introduce a can-body into a second clamp, means for revolving the carrier to present the clamps successively in alinement with said feeding mechanisms, and means for applying solder to the can parts while the latter are held by the clamps.

6. The combination with a revoluble clamp-carrier, of a series of clamps, a can-cover-feeding means for feeding single covers to the clamps, a can-body feeding, means for feeding single bodies to the clamps, means for operating the clamps, an acid-tank, means for elevating the same to apply acid to the clamped parts, a solder-tank, and means for elevating the solder-tank to apply solder to the acid-covered parts.

7. In a can-soldering machine, a revoluble carrier, a plurality of clamps carried thereby, a clamp-operating rod arranged on the carrier, an arcuate guide with which said rods successively engage, means for raising and lowering said guide, means for feeding parts of the can to the clamps, and mechanism for applying acid and solder to said can parts.

8. The combination with a revoluble carrier, of a plurality of can-clamps supported thereby, clamp-operating rods mounted on the carrier and having each a disk or block at its lower end, an arcuate guide into which said disks or blocks successively enter, means for raising and lowering said guides, means for feeding can parts to the clamps, and means for applying acid and solder to said can parts.

9. The combination with a revoluble carrier, of a plurality of can-clamps carried thereby, clamp-operating rods supported by the carrier and each having at its lower end a disk or block, an arcuate guide into which the disks or blocks successively enter, means for raising and lowering said guide, means for feeding can parts to the clamps, an acid-applying tank, means for elevating the same and effecting the immersion of portions of the can, a solder-tank, and means for raising said tank to apply solder to the acid-covered portions of the can.

10. In a can-soldering machine, a revoluble carrier having a plurality of radial arms, a lower clamp-plate rigidly secured to each arm, an upper clamp-plate, a guiding and supporting rod therefor, a series of toggle-levers connected to the upper clamp, and means for operating said toggle-levers to effect opening and closing movement of said clamps.

11. The combination in a can-soldering machine, of a carrier having a plurality of radially-disposed arms, a lower clamp member rigidly secured to each arm, an upper clamping-plate, a guiding and supporting rod therefor, a cross-bar arranged at the upper end of the rod, a system of toggle-levers, links connecting the block to the toggle-levers, a second series of links forming a second connection between the toggle-levers and each of the arms, and means for operating said toggle-levers to effect opening and closing movement of the clamp.

12. In can-soldering mechanism, an inverted cup arranged in the solder and adapted to be depressed by engagement with a can-carrier, said cup forming an air-cushion above the surface of the solder.

13. In a can-soldering mechanism, a solder-tank, an inverted cup arranged therein and forming an air-cushion between the solder-level and the top of the cup, and means for limiting the extent of upward movement of said cup.

14. In a can-soldering machine, a solder-tank, an inverted cup mounted in the solder-tank and forming an air-cushion above the level of the solder, a plurality of bolts forming guides for the cup, and nuts mounted in threaded portions of the bolts and serving to limit upward movement of the cup.

15. In a can-soldering machine, a revoluble carrier, means for imparting a step-by-step rotative movement thereto, a series of can-clamps on said carrier, vertically-guided rods operatively connected to said clamps and provided at their lower ends with disks or blocks, a series of vertically-movable operating-rods carried by the frame of the machine and provided at their upper ends with guides into which said disks or blocks successively enter, means for simultaneously raising and lowering the operating-rods, and means for simultaneously feeding parts of the cans to two of the clamps and for discharging a soldered can from a third clamp.

16. In a device of the class specified, a knock-off means including a pair of guide-rods having their end portions bent forwardly and spaced from each other, and a pair of clamps one of which is provided with a plurality of guiding-fingers for centering the body and bottom of the can.

In testimony that I claim the foregoing as my own I have hereto affixed my signature in the presence of two witnesses.

HENRY DIECKS.

Witnesses:
  F. W. WILLIAMS,
  J. H. McFAUL.